United States Patent
Lyle et al.

(10) Patent No.: US 7,800,514 B2
(45) Date of Patent: *Sep. 21, 2010

(54) DETERMINING BILLBOARD REFRESH RATE BASED ON TRAFFIC FLOW

(75) Inventors: Ruthie D. Lyle, Durham, NC (US); Xiaohu S. Yao, Cary, NC (US)

(73) Assignee: International Business Machines Corporation, Armonk, NY (US)

(*) Notice: Subject to any disclaimer, the term of this patent is extended or adjusted under 35 U.S.C. 154(b) by 30 days.

This patent is subject to a terminal disclaimer.

(21) Appl. No.: 12/335,910

(22) Filed: Dec. 16, 2008

(65) Prior Publication Data

US 2009/0091473 A1    Apr. 9, 2009

Related U.S. Application Data

(63) Continuation of application No. 11/399,225, filed on Apr. 6, 2006, now Pat. No. 7,466,241.

(51) Int. Cl.
    *G06Q 30/00*     (2006.01)
    *G08G 1/01*     (2006.01)
    *G08G 1/09*     (2006.01)

(52) U.S. Cl. ............... 340/905; 705/14.62; 705/14.68; 701/117; 701/118; 701/119

(58) Field of Classification Search ............... 340/905, 340/910, 917, 990, 995.17, 995.27, 691.6; 705/14.5, 14.62, 14.63, 14.68; 701/117–119
See application file for complete search history.

(56) References Cited

U.S. PATENT DOCUMENTS

| | | | |
|---|---|---|---|
| 3,774,147 A | 11/1973 | Hendricks | |
| 5,150,116 A | 9/1992 | West | |
| 5,214,793 A | * 5/1993 | Conway et al. | ............. 455/500 |
| 5,729,214 A | 3/1998 | Moore | |
| 6,060,993 A | 5/2000 | Cohen | |

(Continued)

OTHER PUBLICATIONS

USPTO Office Action, U.S. Appl. No. 11/399,225, Mail Date Dec. 7, 2007.

(Continued)

*Primary Examiner*—Davetta W Goins
*Assistant Examiner*—Anne V Lai
(74) *Attorney, Agent, or Firm*—Raymond Szeto; Hoffman Warnick LLC

(57) ABSTRACT

The present invention relates to the determining of a refresh rate of a dynamic billboard. A system in accordance with an embodiment of the present invention includes: a system for obtaining traffic flow information; a system for determining the refresh rate per minute of the dynamic billboard based on the traffic flow information, wherein the refresh rate is equal to 60 mph/V, wherein V is equal to an average velocity in miles per hour of vehicles passing the dynamic billboard; a system for determining a percent change in the traffic flow information over a predetermined period of time, and comparing the percent change in the traffic flow information to a predetermined threshold value; and a system for changing a display provided by the dynamic bill board in accordance with the refresh rate only if a magnitude of the percent change in the traffic flow information is greater than the predetermined threshold value.

19 Claims, 3 Drawing Sheets

U.S. PATENT DOCUMENTS

| | | |
|---|---|---|
| 6,189,246 B1 | 2/2001 | Gorthala |
| 6,898,517 B1 | 5/2005 | Froeberg |
| 6,909,963 B1 | 6/2005 | Ebert |
| 7,098,805 B2 | 8/2006 | Meadows et al. |
| 7,154,383 B2 | 12/2006 | Berquist |
| 2002/0000921 A1 | 1/2002 | Hutchinson |
| 2002/0112026 A1* | 8/2002 | Fridman et al. ............ 709/217 |
| 2005/0004842 A1 | 1/2005 | Mammen |
| 2005/0237934 A1 | 10/2005 | Mito et al. |
| 2005/0256634 A1 | 11/2005 | Boll |
| 2006/0058941 A1 | 3/2006 | DeKock et al. |
| 2006/0089870 A1 | 4/2006 | Myhr |
| 2006/0180647 A1 | 8/2006 | Hansen |
| 2006/0229939 A1* | 10/2006 | Bhakta et al. ............... 705/14 |
| 2009/0099910 A1* | 4/2009 | Merkin et al. ............... 705/14 |

OTHER PUBLICATIONS

USPTO Final Office Action, U.S. Appl. No. 11/399,225, Mail Date Apr. 10, 2008.

* cited by examiner

DETERMINING BILLBOARD REFRESH RATE BASED ON TRAFFIC FLOW

CROSS-REFERENCE TO RELATED APPLICATIONS

This application is a Continuation application of patent application Ser. No. 11/399,225, filed Apr. 6, 2006, now U.S. Pat. No. 7,466,241, entitled "Determining Billboard Refresh Rate Based on Traffic Flow," which is hereby incorporated in its entirety by reference.

FIELD OF THE INVENTION

The present invention generally relates to advertisements, and more specifically relates to determining the refresh rate of a dynamic billboard based on traffic flow.

RELATED ART

A billboard is a large outdoor advertisement. Billboards are strategically located along high traffic routes to attract the attention of as many people as possible. Several different billboard systems have been implemented: a traditional billboard which shows static content, a mechanical billboard which cycles through multiple advertisements in an arbitrary interval, and a digital billboard which cycles through multiple digital advertisements in an arbitrary interval.

Dynamic mechanical and digital billboard systems have a limited effectiveness because there is no definitive mechanism for adjusting the rate at which the billboard content is refreshed with respect to traffic flow. The result is that an advertisement may not be given an optimum amount of display time.

Accordingly, a need exists for way to determine the refresh rate of a dynamic billboard based on traffic flow.

SUMMARY OF THE INVENTION

The present invention determines the refresh rate of a dynamic billboard based on traffic flow. This allow advertisements (or other displayed messages, images, etc.) to cycle in an optimum fashion, allowing for an optimum review period for each advertisement.

A first aspect of the present invention is directed to a system for determining a refresh rate of a dynamic billboard, comprising: a system for obtaining traffic flow information; a system for determining the refresh rate per minute of the dynamic billboard based on the traffic flow information, wherein the refresh rate is equal to 60 mph/V, wherein V is equal to an average velocity in miles per hour of vehicles passing the dynamic billboard; a system for determining a percent change in the traffic flow information over a predetermined period of time, and comparing the percent change in the traffic flow information to a predetermined threshold value; and a system for changing a display provided by the dynamic bill board in accordance with the refresh rate only if a magnitude of the percent change in the traffic flow information is greater than the predetermined threshold value.

A second aspect of the present invention is directed to computer program product stored on a computer readable medium, which when executed, determines a refresh rate of a dynamic billboard, the computer readable medium comprising program code for: obtaining traffic flow information; determining the refresh rate per minute of the dynamic billboard based on the traffic flow information, wherein the refresh rate is equal to 60 mph/V, wherein V is equal to an average velocity in miles per hour of vehicles passing the dynamic billboard; determining a percent change in the traffic flow information over a predetermined period of time, and comparing the percent change in the traffic flow information to a predetermined threshold value; and changing a display provided by the dynamic bill board in accordance with the refresh rate only if a magnitude of the percent change in the traffic flow information is greater than the predetermined threshold value.

A third aspect of the present invention is directed to a method for deploying an application for determining a refresh rate of a dynamic billboard, comprising: providing a computer infrastructure being operable to: obtain traffic flow information; determine the refresh rate per minute of the dynamic billboard based on the traffic flow information, wherein the refresh rate is equal to 60 mph/V, wherein V is equal to an average velocity in miles per hour of vehicles passing the dynamic billboard; determine a percent change in the traffic flow information over a predetermined period of time, and comparing the percent change in the traffic flow information to a predetermined threshold value; and change a display provided by the dynamic bill board in accordance with the refresh rate only if a magnitude of the percent change in the traffic flow information is greater than the predetermined threshold value.

The illustrative aspects of the present invention are designed to solve the problems herein described and other problems not discussed

BRIEF DESCRIPTION OF THE DRAWINGS

These and other features of this invention will be more readily understood from the following detailed description of the various aspects of the invention taken in conjunction with the accompanying drawings in which.

Figure 1:
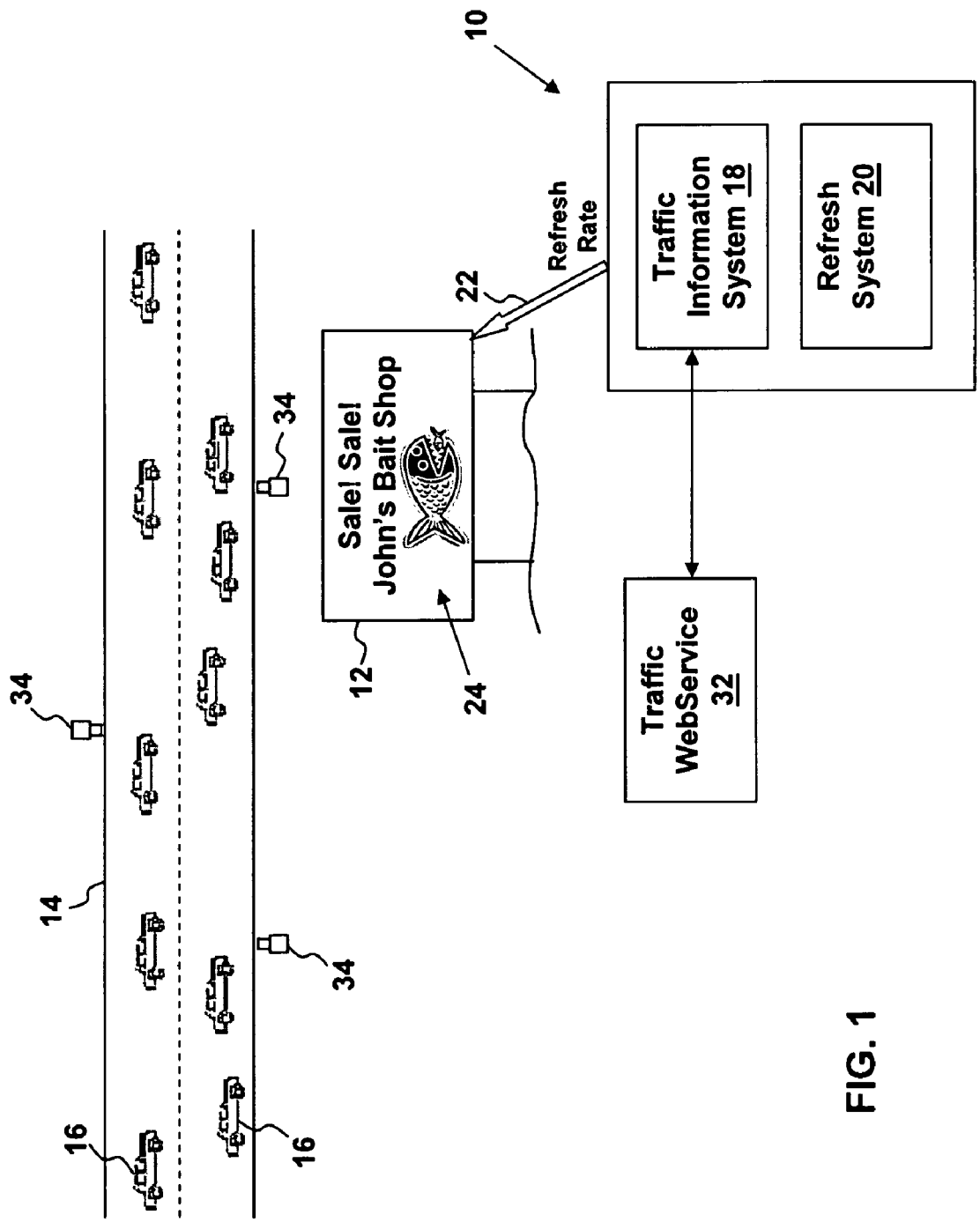
FIG. 1 depicts an illustrative system for determining the refresh rate of a dynamic billboard in accordance with an embodiment of the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

An illustrative refresh rate determining system 10 for determining the refresh rate of a dynamic billboard 12 in accordance with an embodiment of the present invention is depicted in FIG. 1. The dynamic billboard 12 is located near a highway 14 and is visible to the occupants of the vehicles 16 passing by on the highway 14. The term "highway" is defined herein as any road, artery, freeway, thruway, expressway, toll road, path, street, avenue, etc., along which a vehicle 16 (e.g., automobile, truck, bus, motorcycle, and/or other ground-based mode of transportation) can travel.

The refresh rate determining system 10 includes a traffic information system 18 for obtaining information regarding the flow of traffic (e.g., velocity of vehicles 16, flow rate of vehicles 16, density of vehicles 16, etc.) in the vicinity of the dynamic billboard 12, and a refresh system 20 for determining a refresh rate 22 for the advertisements 24 displayed by the dynamic billboard 12, based on the traffic flow information obtained by the traffic information system 18. The refresh rate 22 is provided to the dynamic billboard 12, which cycles through a plurality of different advertisements 24 in accordance with the refresh rate 22. To this extent, the dynamic billboard 12 cycles through a plurality of advertisements 24 in an optimal manner based on current traffic flow information. For example, when traffic slows down in the vicinity of the dynamic billboard 12, the refresh rate determining system 10 increases the refresh rate of the dynamic billboard 12, such that a larger number of advertisements (i.e., number of advertisements per unit time) are displayed to the occupants of the vehicles 16. Contrastingly, when traffic speeds up in the vicinity of the dynamic billboard 12, the refresh rate determining system 10 decreases the refresh rate of the dynamic billboard 12, such that fewer advertisements are displayed to the occupants of the vehicles 16. Alternatively, when the density of traffic on the highway 14 increases in the vicinity of the dynamic billboard 12, and is accompanied by a decrease in vehicular velocity, the refresh rate determining system 10 increases the refresh rate of the dynamic billboard 12, such that a larger number of advertisements (i.e., number of advertisements per unit time) are displayed to the occupants of the vehicles 16. Contrastingly, when the density of traffic on the highway 14 decreases in the vicinity of the dynamic billboard 12, and is accompanied by an increase in vehicular velocity, the refresh rate determining system 10 decreases the refresh rate of the dynamic billboard 12, such that fewer advertisements are displayed to the occupants of the vehicles 16. The refresh rate determining system 10 can be provided as a component of the dynamic billboard 22 or can be provided as a separate system that is connected to the dynamic billboard 22 in a suitable manner.

Figure 2:
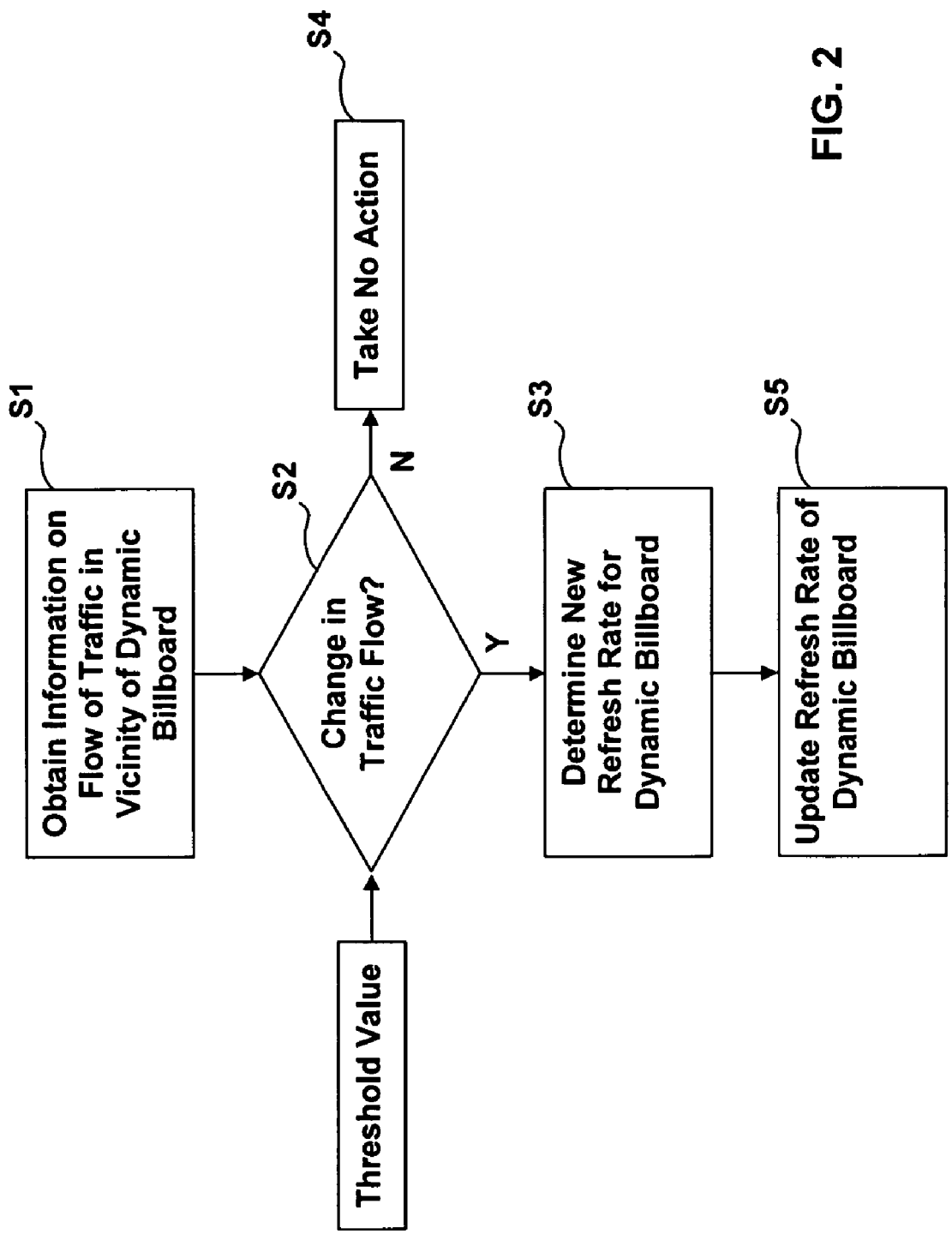
FIG. 2 depicts a flow diagram of an illustrative process for determining the refresh rate of a dynamic billboard in accordance with an embodiment of the present invention.

A flow diagram 30 of an illustrative process for determining the refresh rate of a dynamic billboard in accordance with an embodiment of the present invention is depicted in FIG. 2. The flow diagram 30 is described below in conjunction with the components of the illustrative refresh rate determining system 10 depicted in FIG. 1.

In step S1, the traffic information system 18 obtains information on the flow of traffic along the highway 14 in the vicinity of the dynamic billboard 12. The traffic flow information can be obtained periodically (e.g., every five minutes), continuously, or according to a predetermined schedule (e.g., more often during rush hour). The traffic flow information can be obtained in many different ways. For instance, in accordance with a first embodiment of the present invention, the traffic information system 18 can request real-time traffic flow information via the Internet from a WebService 32 that gathers traffic flow data using roadside sensors 34 distributed along the highway 14. The roadside sensors 34 can be configured to measure, for example, the velocity, frequency, and/or density of the vehicles 16 on the highway 14. In accordance with another embodiment of the present invention, the traffic information system 18 can obtain real-time traffic flow data directly from the roadside digital sensors 34.

The roadside sensors 34 can use any suitable technique, or combination of suitable techniques, to obtain data for use in measuring traffic flow. For example, the roadside sensors 34 can be configured to obtain the data using one or more of: radio waves, light waves (optical or infrared), microwaves, sound waves, analog signals, digital signals, Doppler shifts, pressure measurements, global positioning system (GPS) systems, cellular telephone systems, intelligent vision systems, etc. Further, the roadside sensors 34 can be configured to detect the passage of vehicles 16 having magnetic tags or markers, and/or to use signals reflected from and/or transmitted by the vehicles 16.

In step S2 of the flow diagram 30 depicted in FIG. 2, the traffic flow information obtained in step S1 is examined to determine whether the traffic flow along the highway 14 in the vicinity of the dynamic billboard 12 has changed enough to warrant a change in the refresh rate of the dynamic billboard 12. If the traffic flow has changed more than a predetermined threshold value (e.g., the velocity of the vehicles 16 or the density of vehicles 16 along the highway 14 in the vicinity of the dynamic billboard 12 has increased/decreased more than X % (e.g., 10%) over a predetermined period of time), then flow passes to step S3. If, however, the traffic flow has not changed more than the predetermined threshold value, then flow passes to step S4 and no action is taken.

In step S3, a new (updated) refresh rate to be used by the dynamic billboard 12 is determined, based on the traffic flow information obtained in step S1. An illustrative method for determining the new refresh rate of the dynamic billboard 12 is based on the velocity of the vehicles 16:

$$\text{Refresh Rate: } N=60 \text{ mph}/V,$$

where N is the refresh rate per minute of the dynamic billboard 12 (i.e., the number of advertisements displayed by the dynamic billboard 12 per minute) and V is the average velocity (miles/hour) of the vehicles 16 passing along the highway 14 in the vicinity of the dynamic billboard 12. To this extent, if the average velocity is 60 mph, the new refresh rate of the dynamic billboard 12 is one refresh per minute (i.e., each advertisement is displayed for one minute), while if the average velocity is 10 mph, the new refresh rate of the dynamic billboard 12 is six refreshes per minute (i.e., each advertisement is displayed for ten seconds). The above-example is provided for illustrative purposes only. Many other schemes for determining the refresh rate of the dynamic billboard 12 are also possible. In step S5, the dynamic billboard 12 updates its refresh rate in accordance with the refresh rate determined in step S5.

Figure 3:
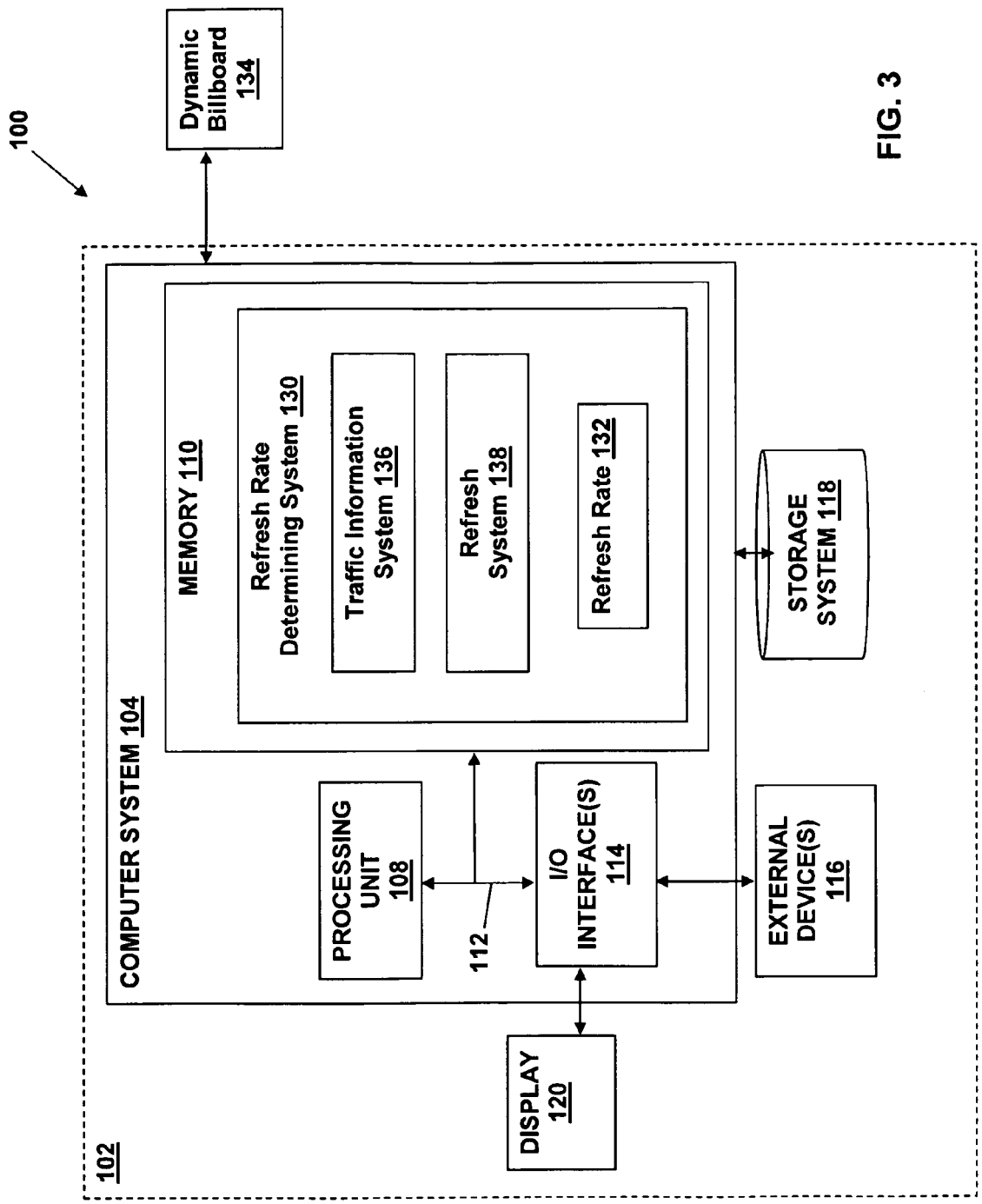
FIG. 3 depicts an illustrative computer system for implementing embodiment(s) of the present invention.

FIG. 3 shows an illustrative system 100 for determining the refresh rate of a dynamic billboard in accordance with embodiment(s) of the present invention. To this extent, the system 100 includes a computer infrastructure 102 that can perform the various process steps described herein for determining the refresh rate of a dynamic billboard. In particular, the computer infrastructure 102 is shown including a computer system 104 that comprises a refresh rate determining system 130, which enables the computer system 104 to determine the refresh rate 132 of a dynamic billboard 134 by performing the process steps of the invention.

The computer system 104 is shown as including a processing unit 108, a memory 110, at least one input/output (I/O) interface 114, and a bus 112. Further, the computer system 104 is shown in communication with at least one external device 116 and a storage system 118. In general, the processing unit 108 executes computer program code, such as the refresh rate determining system 130, that is stored in memory 110 and/or storage system 118. While executing computer program code, the processing unit 108 can read and/or write data from/to the memory 110, storage system 118, and/or I/O interface(s) 114. Bus 112 provides a communication link between each of the components in the computer system 104. The at least one external device 116 can comprise any device (e.g., display 120) that enables a user (not shown) to interact with the computer system 104 or any device that enables the computer system 104 to communicate with one or more other computer systems.

In any event, the computer system 104 can comprise any general purpose computing article of manufacture capable of executing computer program code installed by a user (e.g., a personal computer, server, handheld device, etc.). However, it is understood that the computer system 104 and the refresh rate determining system 130 are only representative of various possible computer systems that may perform the various process steps of the invention. To this extent, in other embodiments, the computer system 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, the computer infrastructure 102 is only illustrative of various types of computer infrastructures that can be used to implement the invention. For example, in one embodiment, the computer infrastructure 102 comprises two or more computer systems (e.g., a server cluster) that communicate over any type of wired and/or wireless communications link, such as a network, a shared memory, or the like, to perform the various process steps of the invention. When the communications link comprises a network, the network can comprise any combination of one or more types of networks (e.g., the Internet, a wide area network, a local area network, a virtual private network, etc.). Regardless, communications between the computer systems may utilize any combination of various types of transmission techniques.

As previously mentioned, the refresh rate determining system 130 enables the computer system 104 to determine the refresh rate 132 of a dynamic billboard 134. To this extent, the refresh rate determining system 130 is shown as including a traffic information system 136 for obtaining information regarding the flow of traffic (e.g., density of vehicles, velocity of vehicles, etc.) in the vicinity of the dynamic billboard 134, and a refresh system 138 for determining the refresh rate 132 for the advertisements displayed by the dynamic billboard 134, based on the traffic flow information obtained by the traffic information system 136. Operation of each of these systems is discussed above. It is understood that some of the various systems shown in FIG. 3 can be implemented independently, combined, and/or stored in memory for one or more separate computer systems 104 that communicate over a network. Further, it is understood that some of the systems and/or functionality may not be implemented, or additional systems and/or functionality may be included as part of the system 100.

While shown and described herein as a method and system for determining the refresh rate of a dynamic billboard, it is understood that the invention further provides various alternative embodiments. For example, in one embodiment, the invention provides a computer-readable medium that includes computer program code to enable a computer infrastructure to determine the refresh rate of a dynamic billboard. To this extent, the computer-readable medium includes program code, such as the refresh rate determining system 130, which implements each of the various process steps of the invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computer system, such as the memory 110 and/or storage system 118 (e.g., a fixed disk, a read-only memory, a random access memory, a cache memory, etc.), etc.

In another embodiment, the invention provides a business method that performs the process steps of the invention on a subscription, advertising, and/or fee basis. That is, a service provider could offer to determine the refresh rate of a dynamic billboard as described above. In this case, the service provider can create, maintain, support, etc., a computer infrastructure, such as the computer infrastructure 102, that performs the process steps of the invention for one or more customers. In return, the service provider can receive payment from the customer(s) under a subscription and/or fee agreement and/or the service provider can receive payment from the sale of advertising space to one or more third parties.

In still another embodiment, the invention provides a method of determining the refresh rate of a dynamic billboard. In this case, a computer infrastructure, such as the computer infrastructure 102, can be obtained (e.g., created, maintained, having made available to, etc.) and one or more systems for performing the process steps of the invention can be obtained (e.g., created, purchased, used, modified, etc.) and deployed to the computer infrastructure. To this extent, the deployment of each system can comprise one or more of (1) installing program code on a computer system, such as the computer system 104, from a computer-readable medium; (2) adding one or more computer systems to the computer infrastructure; and (3) incorporating and/or modifying one or more existing systems of the computer infrastructure, to enable the computer infrastructure to perform the process steps of the invention.

As used herein, it is understood that the terms "program code" and "computer program code" are synonymous and mean any expression, in any language, code or notation, of a set of instructions intended to cause a computer system having an information processing capability to perform a particular function either directly or after either or both of the following: (a) conversion to another language, code or notation; and (b) reproduction in a different material form. To this extent, program code can be embodied as one or more types of program products, such as an application/software program, component software/a library of functions, an operating system, a basic I/O system/driver for a particular computing and/or I/O device, and the like.

The foregoing description of the preferred embodiments of this invention has been presented for purposes of illustration and description. It is not intended to be exhaustive or to limit the invention to the precise form disclosed, and obviously, many modifications and variations are possible.

The invention claimed is:

1. A system for determining a refresh rate of a dynamic billboard, comprising:
    a system for obtaining traffic flow information;
    a system for determining the refresh rate per minute of the dynamic billboard based on the traffic flow information, wherein the refresh rate is equal to X/V, wherein X is a predetermined velocity, and wherein V is equal to an average velocity of vehicles passing the dynamic billboard;
    a system for determining a percent change in the traffic flow information over a predetermined period of time, and comparing the percent change in the traffic flow information to a predetermined threshold value; and
    a system for changing a display provided by the dynamic bill board in accordance with the refresh rate only if a magnitude of the percent change in the traffic flow information is greater than the predetermined threshold value.

2. The system of claim 1, wherein the dynamic billboard is selected from the group consisting of a mechanical billboard and a digital billboard.

3. The system of claim 1, wherein the display comprises an advertisement.

4. The system of claim 1, further comprising:
a system for updating the refresh rate of the dynamic billboard based on current traffic flow information.

5. The system of claim 1, further comprising:
a system for increasing the refresh rate of the dynamic billboard when traffic slows down in a vicinity of the dynamic billboard.

6. The system of claim 1, further comprising:
a system for decreasing the refresh rate of the dynamic billboard when traffic speeds up in a vicinity of the dynamic billboard.

7. The system of claim 1, wherein the system for obtaining traffic flow information and determining the refresh rate periodically obtains traffic flow information and the refresh rate.

8. A computer program product stored on a computer readable storage medium, which when executed, determines a refresh rate of a dynamic billboard, the computer readable storage medium comprising program code for:
obtaining traffic flow information;
determining the refresh rate per minute of the dynamic billboard based on the traffic flow information, wherein the refresh rate is equal to X/V, wherein X is a predetermined velocity, and wherein V is equal to an average velocity of vehicles passing the dynamic billboard;
determining a percent change in the traffic flow information over a predetermined period of time, and comparing the percent change in the traffic flow information to a predetermined threshold value; and
changing a display provided by the dynamic bill board in accordance with the refresh rate only if a magnitude of the percent change in the traffic flow information is greater than the predetermined threshold value.

9. The program product of claim 8, wherein the dynamic billboard is selected from the group consisting of a mechanical billboard and a digital billboard.

10. The program product of claim 8, wherein the display comprises an advertisement.

11. The program product of claim 8, further comprising program code for:
updating the refresh rate of the dynamic billboard based on current traffic flow information.

12. The program product of claim 8, further comprising program code for:
increasing the refresh rate of the dynamic billboard when traffic slows down in a vicinity of the dynamic billboard.

13. The program product of claim 8, further comprising program code for:
decreasing the refresh rate of the dynamic billboard when traffic speeds up in a vicinity of the dynamic billboard.

14. The program product of claim 8, wherein the program code for obtaining traffic flow information and determining the refresh rate periodically obtains traffic flow information and the refresh rate.

15. A method for determining a refresh rate of a dynamic billboard, comprising:
obtaining traffic flow information;
determining the refresh rate per minute of the dynamic billboard based on the traffic flow information, wherein the refresh rate is equal to X/V, wherein X is a predetermined velocity, and wherein V is equal to an average velocity of vehicles passing the dynamic billboard;
determining a percent change in the traffic flow information over a predetermined period of time, and comparing the percent change in the traffic flow information to a predetermined threshold value; and
changing a display provided by the dynamic bill board in accordance with the refresh rate only if a magnitude of the percent change in the traffic flow information is greater than the predetermined threshold value.

16. The method of claim 15, wherein the dynamic billboard is selected from the group consisting of a mechanical billboard and a digital billboard.

17. The method of claim 15, further comprising:
updating the refresh rate of the dynamic billboard based on current traffic flow information.

18. The method of claim 15, further comprising:
increasing the refresh rate of the dynamic billboard when traffic slows down in a vicinity of the dynamic billboard; or
decreasing the refresh rate of the dynamic billboard when traffic speeds up in a vicinity of the dynamic billboard.

19. The method of claim 15, wherein obtaining traffic flow information and determining the refresh rate are performed periodically.

* * * * *